US006577180B2

(12) United States Patent
Liu

(10) Patent No.: US 6,577,180 B2
(45) Date of Patent: Jun. 10, 2003

(54) CORRECTION SYSTEM OF RESISTANCE INACCURACY IN AN INTEGRATED CIRCUIT PROCESS

(75) Inventor: Yu-Hua Liu, Hsin-Chu Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 0 days.

(21) Appl. No.: 09/682,629

(22) Filed: Oct. 1, 2001

(65) Prior Publication Data

US 2002/0041200 A1 Apr. 11, 2002

(30) Foreign Application Priority Data

Oct. 5, 2000 (TW) ....................................... 89120755 A

(51) Int. Cl.[7] ................................................ H02M 7/00

(52) U.S. Cl. ...................... 327/532; 327/344; 341/155; 341/159

(58) Field of Search ................................ 327/311, 306, 327/77, 63, 65, 66, 127, 362, 337, 344, 355, 532; 341/155, 159

(56) References Cited

U.S. PATENT DOCUMENTS 4,804,863 A * 2/1989 Welland et al. ............. 327/127
5,625,316 A 4/1997 Chambers et al. .......... 327/553
6,437,724 B1 * 8/2002 Nagaraj ...................... 341/159
6,452,444 B1 * 9/2002 Mehr ......................... 327/554

FOREIGN PATENT DOCUMENTS

DE 19607802 A1 9/1997

OTHER PUBLICATIONS

Roesgen, John P., Warren, George H.=An Analog Front END Chip for V. 32 Modems–In=IEEE 1989 Custom Integrated Circuits Conference, S. 1611–1615.

Tretze, Schenk=Halbleiter–Schaltungstechnik, Springer–Verlag, 1999, 11. Aufl., S 1047–1049.

* cited by examiner

*Primary Examiner*—Tuan T. Lam
*Assistant Examiner*—Hiep Nguyen
(74) *Attorney, Agent, or Firm*—Winston Hsu

(57) ABSTRACT

A component inaccuracy correction system has a current source capable of outputting two currents with a fixed ratio, a voltage dividing circuit formed on the integrated circuit having at least an output end capable of receiving a current of the current source to output a divided voltage, a reference voltage generator capable of receiving another current of the current source to output a reference voltage, a comparison circuit electrically connected to the output end of the voltage dividing circuit for receiving the divided voltage from the voltage dividing circuit and comparing the divided voltage to the reference voltage to create a corresponding comparison signal, and a correction circuit electrically connected to the comparison circuit for correcting component inaccuracies of the integrated circuit according to the comparison signal generated by the comparison circuit.

18 Claims, 6 Drawing Sheets

| | I | II | III | IV | V | VI | VII | VIII |
|---|---|---|---|---|---|---|---|---|
| H15 | ON | OFF | OFF | OFF | OFF | OFF | OFF | OFF |
| H10 | ON | ON | OFF | OFF | OFF | OFF | OFF | OFF |
| H05 | ON | ON | ON | OFF | OFF | OFF | OFF | OFF |
| L05 | ON | ON | ON | ON | ON | OFF | OFF | OFF |
| L10 | ON | ON | ON | ON | ON | ON | OFF | OFF |
| L15 | ON | ON | ON | ON | ON | ON | ON | OFF |

Fig. 5

CORRECTION SYSTEM OF RESISTANCE INACCURACY IN AN INTEGRATED CIRCUIT PROCESS

BACKGROUND OF THE INVENTION

1. Field of the Invention

The present invention relates to a component inaccuracy correction system, and more particularly, to a correction system for correcting a resistance inaccuracy caused by an integrated circuit manufacturing process.

2. Description of the Prior Art

Integrated circuits arewidely found in day-to-day life, from watches and cellular telephones, all the way to supercomputers. However, due to problems in manufacturing process controls, the characteristics of each component in an integrated circuit may deviate from the characteristics originally designed, and so the functionality of the integrated circuit may not meet the original design specifications. For example, the resistors in an integrated circuit may have inaccurate resistance values because the fabrication process is not ideal. Such process inaccuracies makes the real resistance values of all resistor components in the integrated circuit deviate from the original design values by the same ratio, i.e. the ratio of deviation from the original design value of each resistor component in the integrated circuit is the same.

To avoid the above-mentioned resistance inaccuracies, U.S. Pat. No. 5,625,316 offers an inaccuracy correction system to correct resistance inaccuracies in a wave filter. Please refer to FIG. 1. FIG. 1 is a block diagram of a prior art component inaccuracy correction system 510 used to correct resistance inaccuracies of the wave filter 520. The wave filter 520 comprises a resistor Rf and a variable capacitor 560. The product of the two is the RC time constant that determines the bandwidth of the wave filter 520. If the resistance of Rf is affected by the integrated circuit manufacturing process and is inaccurate, the bandwidth of the wave filter 520 may deviate from the original, designed value. To keep the bandwidth fixed, the component inaccuracy correction system 510 changes the value of the capacitor 560 to compensate for inaccuracies in the resistance of Rf.

In the prior art component inaccuracy correction system 510, Vcc provides a bias voltage for the correction system 510. The resistorRref is an additional resistor installed outside of the integrated circuit, and so having a resistance that is not affected by the integrated circuit manufacturing process. The resistor Rc and the resistor Rf of the wave filter 520 are both made in the same integrated circuit manufacturing process, and so both of these resistors may suffer the same level of resistance inaccuracies. The correction system 510 further comprises a regulated generator 530 for producing a standard voltage Vbg, a reference voltage generator 540 for producing a reference voltage Vref according to the standard voltage Vbg, and an analog-to-digital converter (ADC) 550.

The working principle of the prior art component inaccuracy correction system 510 is described as follows. The regulated generator 530 generates a standard voltage Vbg, and the standard voltage Vbg is not only inputted into the reference voltage generator 540 to generate the reference voltage Vref, but is also linked to one end of the additional resistor Rref by way of the operational amplifierP to create a reference current Iref according to the voltage drop across Rref. That is, Iref=(Vcc−Vbg)/Rref. The reference current Iref flows through the transistor T and the resistor Rc, and generates a comparison voltage Vc. As mentioned above, the resistance values of Rc and Rf of the wave filter 520 have the same level of deviation from the designed values because both are fabricated in the same integrated circuit manufacturing process. By comparing the reference voltage Vref to the comparison voltage Vc, the resistance inaccuracies of the resistorRc and the resistor Rf of the wave filter 520 can be learned. The analog-to-digital converter 550 is used to compare the reference voltage Vref to the comparison voltage Vc and to generate corresponding control signals to change the value of the variable capacitor 560 of the wave filter 520 to compensate for the the resistance inaccuracies.

A shortcoming of the component inaccuracy correction system 510 is that both Vcc and Vbg are needed to create the standard current Iref. In some electronic devices, especially in portable electronic devices, the power supplied to the integrated circuit is generated by a battery. As battery power is consumed, the bias voltage Vcc deviates from a required value. In this situation, even though the regulated generator 530 may provide a stable voltage Vbg, the standard current Iref will nevertheless be incorrect. An incorrect reference current Iref with the resistor Rc will necessarily generate an incorrect comparison voltage Vc. When the analog-to-digital converter 550 compares the incorrect comparison voltage Vc to the correct reference voltage Vref, resistance inaccuracies cannot be properly corrected.

SUMMARY OF THE INVENTION

It is therefore a primary objective of the present invention to provide a component inaccuracy correction system to solve the above-mentioned problem.

In a preferred embodiment, the present invention provides a component inaccuracy correction system for correcting component inaccuracy in an integrated circuit. This component inaccuracy is caused by the fabrication process for making the component, which may cause characteristics of the component to deviate from an original design value. The component inaccuracy correction system has a current source capable of outputting two currents with a fixed ratio, a voltage dividing circuit formed on the integrated circuit having at least an output end capable of receiving a current of the current source to create and output a divided voltage, a reference voltage generator capable of receiving another current of the current source to create and output a reference voltage, a comparison circuit electrically connected to the output end of the voltage dividing circuit for receiving the divided voltage from the voltage dividing circuit and comparing the divided voltage to the reference voltage to create a corresponding comparison signal, and a correction circuit electrically connected to the comparison circuit for correcting the component inaccuracy on the integrated circuit according to the comparison signal generated by the comparison circuit.

It is an advantage of the present invention that the component inaccuracy correction system uses a current generator to supply current respectively to an additional resistor and a set of series resistors so that the additional resistor and the series resistors generate a fixed ratio between the reference voltage and the divided voltage to prevent the component inaccuracy correction system from incorrectly correcting resistance inaccuracies due to power changes.

These and other objectives and advantages of the present invention will no doubt become obvious to those of ordinary skill in the art after having read the following detailed description of the preferred embodiment that is illustrated in the various figures and drawings.

BRIEF DESCRIPTION OF DRAWINGS

FIG. 5 is a diagram of each correction circuit unit of FIG. 3 changing to ON or OFF according to related resistance inaccuracies.

DETAILED DESCRIPTION

Figure 1:
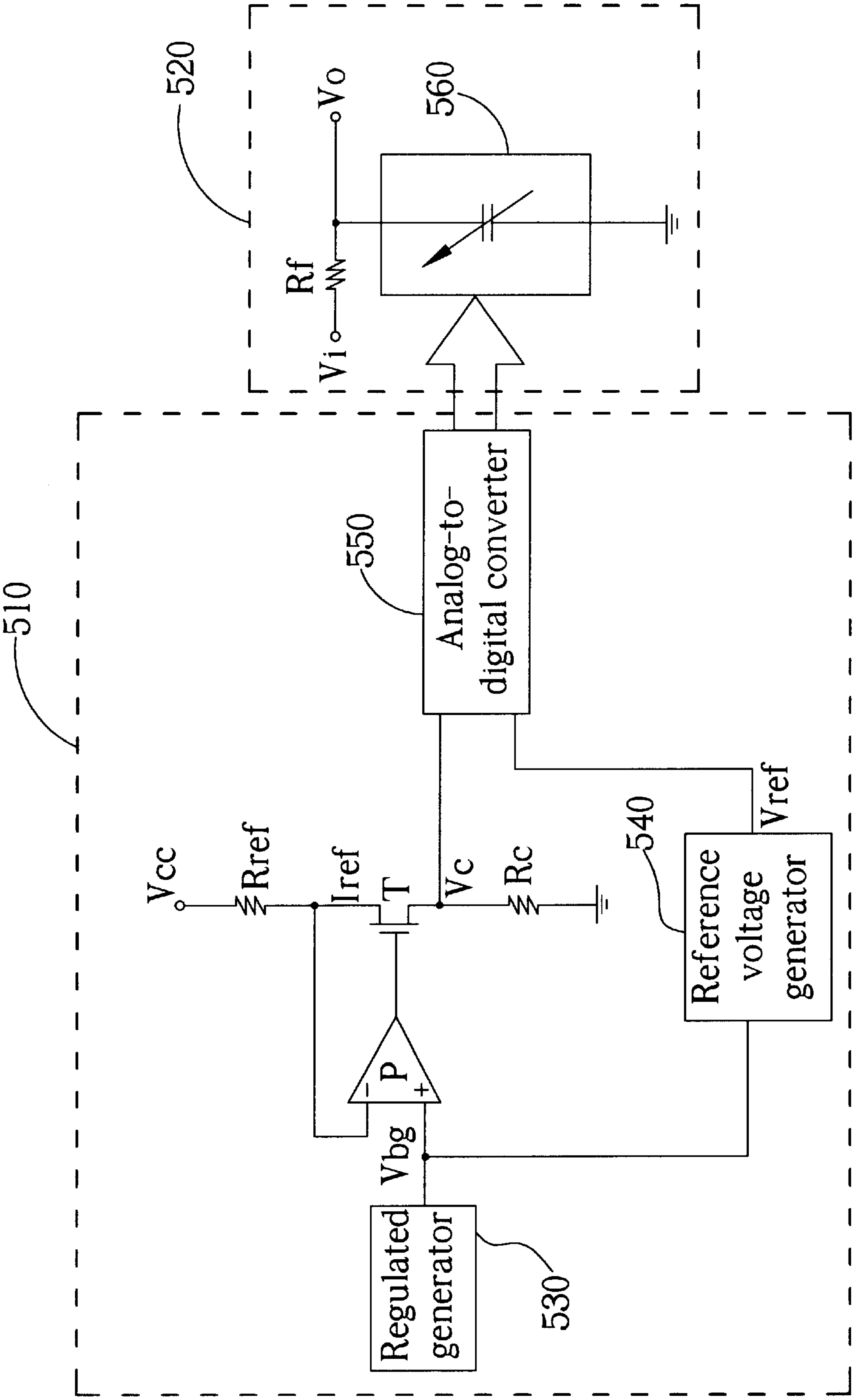
Fig. 1 Prior art
FIG. 1 is a circuit block diagram of a prior art component inaccuracy correction system used to correct resistance inaccuracy in a wave filter.
Figure 2:
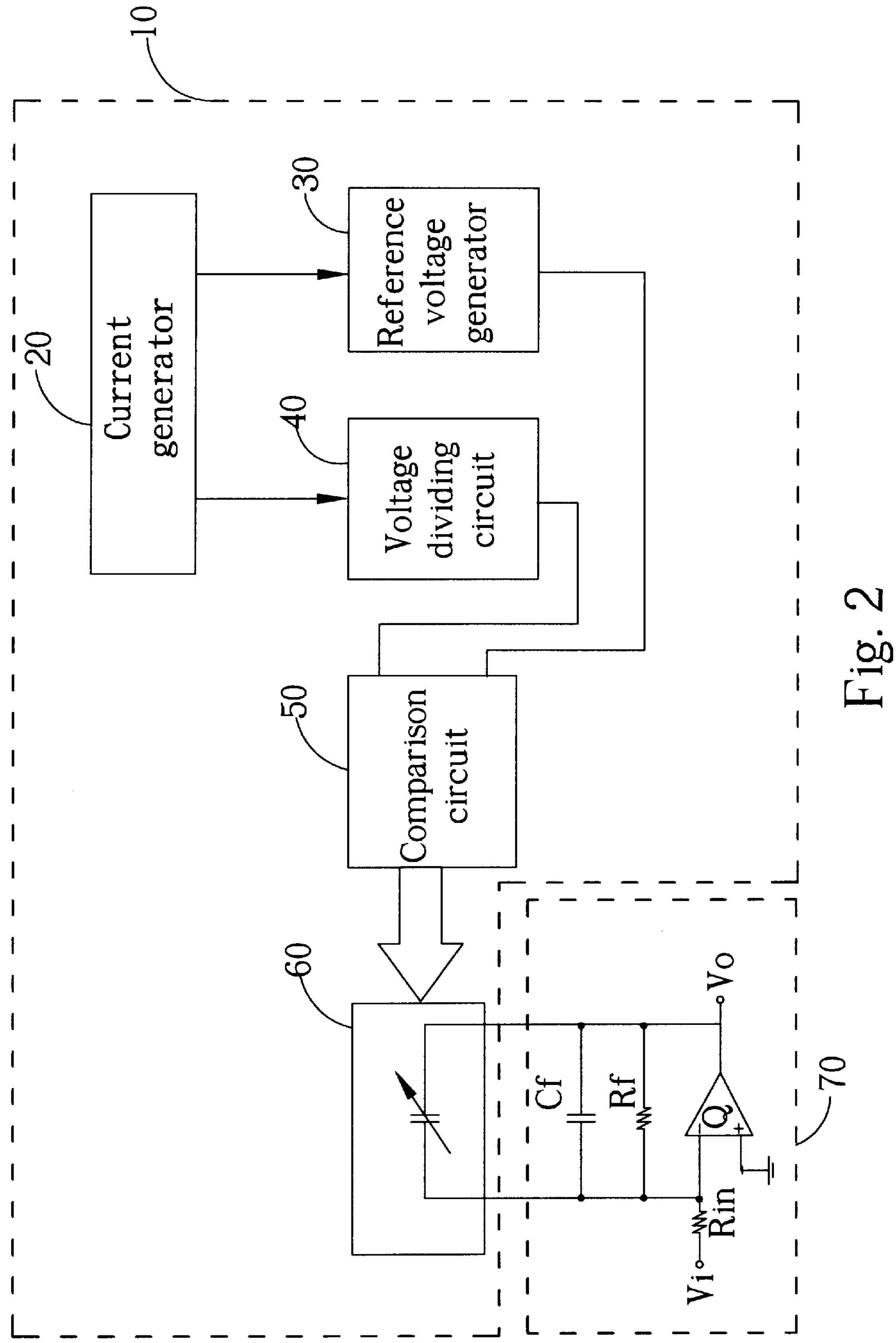
FIG. 2 is a block diagram of the present invention component inaccuracy correction system used in a wave filter.
Figure 6:
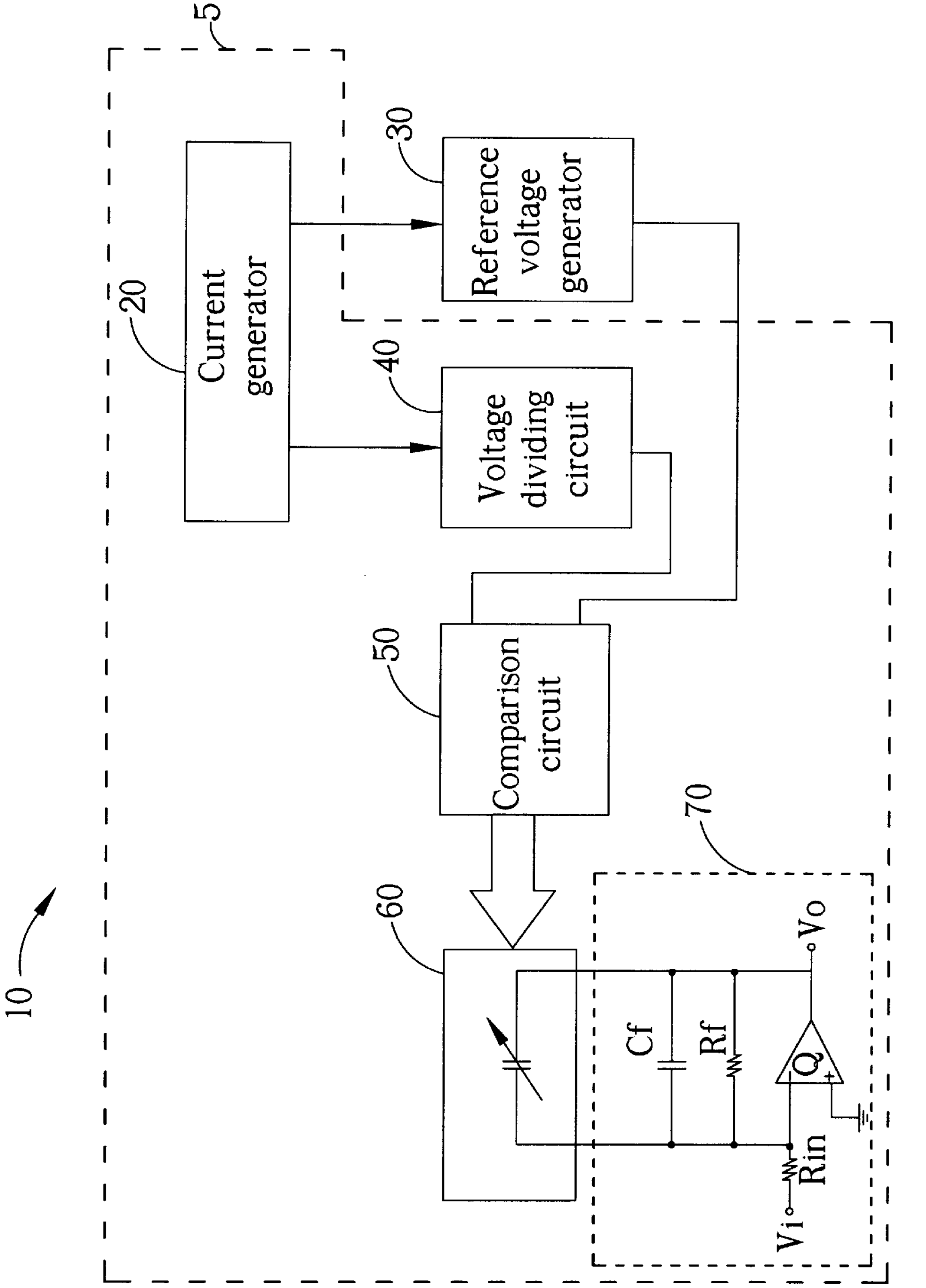
FIG. 6 is a block diagram of the component inaccuracy correction system of FIG. 2 showing a reference voltage generator connected to an integrated circuit.

Please refer to FIG. 2 and FIG. 6. FIG. 2 is a block diagram of a present invention component inaccuracy correction system 10 for use with an RC wave filter 70. FIG. 6 is a block diagram of the component inaccuracy correction system 10 showing a reference voltage generator 30 connected to an integrated circuit 5. The component inaccuracy correction system 10 comprises a current generator 20. The current generator 20 generates two currents, which are respectively provided to the reference voltage generator 30 and a voltage dividing circuit 40. The divided voltage of the voltage dividing circuit 40, and the reference voltage generated by the reference voltage generator 30, are respectively provided to two input ends of a comparison circuit 50. A comparison result from the comparison circuit 50 is than provided to a correction circuit 60 such that the correction circuit 60 can correct the wave filter 70. In the preferred embodiment, the correction circuit 60 is a variable capacitor electrically connected in parallel to the wave filter 70. The integrated circuit 5 includes the current generator 20, the voltage dividing circuit 40, the comparison circuit 50, the correction circuit, and the wave filter 70. The reference voltage generator 30 is formed outside the integrated circuit 5, and is connected to the integrated circuit 5. The comparison circuit 50 is an analog-to-digital converter for converting the signals from the voltage dividing circuit 40 into digital signals to control the correction circuit 60. As shown in FIG. 2, the wave filter 70 comprises an operational amplifier Q, with the main wave filter components being a resistor Rf and a capacitor Cf. If the resistance of Rf deviates from the designed value due to deviations in the fabrication process, the product (Rf*Cf) of the resistance of Rf and the total capacitance of Cf with the variable capacitor in the correction circuit 60 is also affected. In other words, inaccuracy in the fabrication process of the integrated circuit 5 changes the RC time constant of the wave filter 70, and hence the bandwidth of the wave filter 70 is inaccurate. So the wave filter 70 does not work as originally designed. Consequently, the capacitance of the variable capacitor in the correction circuit 60 must be changed to compensate for the resistance inaccuracy of the resistor Rf so as to restore the bandwidth of the wave filter 70 to desired characteristics.

Figure 3:
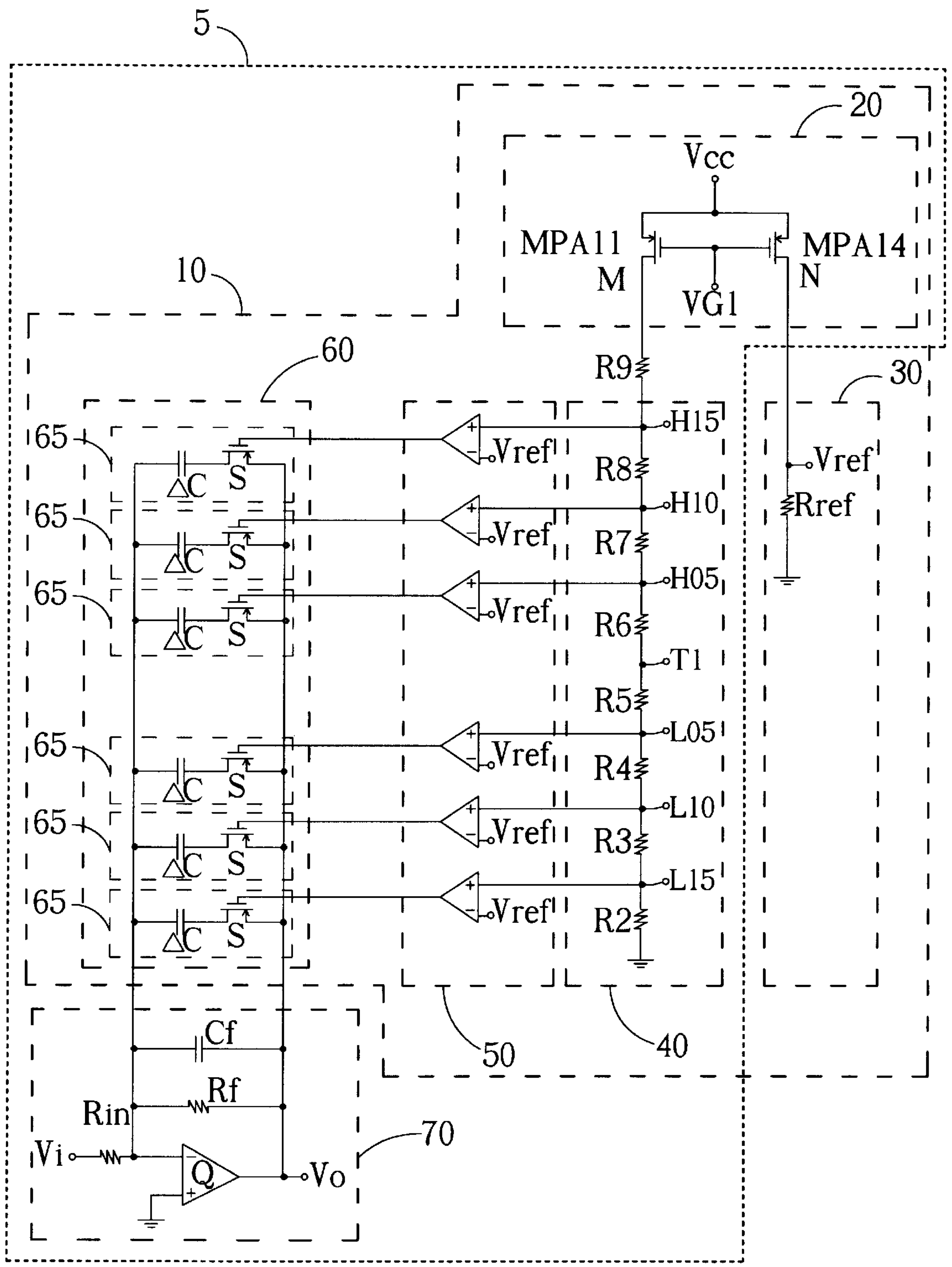
FIG. 3 is a circuit diagram of the component inaccuracy correction system used in the wave filter as shown in FIG. 2.

Please refer to FIG. 3. FIG. 3 is a circuit diagram of the component inaccuracy correction system 10 for use with the wave filter 70 in this embodiment. The current generator 20 is a current mirror comprising two transistors MPA11 and MPA14, both supplied with bias voltages of Vcc and VG1. The fabrication process technology for semiconductors ensures that the aspect ratio (i.e. W/L ratio) of the transistors MPA11 and MPA14 can be kept to M:N, so that the ratio of the currents respectively generated in both default working areas can also be kept to M:N. The reference voltage generator 30 comprises an additional resistor Rref. The additional resistor Rref is installed outside of the integrated circuit 5, and is electrically connected to the transistor MPA14 of the current generator 20, and to ground of the integrated circuit 5. Because the additional resistor Rref is installed outside of the integrated circuit 5, the value of the resistance is not affected by fabrication inaccuracies of the integrated circuit manufacturing process. The inaccuracy of the resistance of such a discrete, external resistor can be between 1/1000 and 1/100 (i.e., between 0.1% and 1%), so the additional resistor Rref may serve as a standard to identify and quantify the resistance inaccuracy in the integrated circuit 5. The voltage across the additional resistor Rref is a reference voltage Vref.

The voltage dividing circuit 40 of the present invention component inaccuracy correction system 10 is composed of a plurality of voltage dividing resistors. Please refer to FIG. 3. These voltage dividing resistors include R2, R3, R4, R5, R6, R7, and R8, and the nodes of the current input end of the voltage dividing resistors are respectively labeled L15, L10, L05, T1, H05, H10, and H15. The voltage dividing resistors R2 to R8, and the resistor Rf of the wave filter 70, are all built on the same integrated circuit 5, and are all fabricated in the same manufacturing process. Therefore, each voltage dividing resistor R2 to R8, and the resistor Rf of the wave filter 70, all suffer from the same resistance inaccuracy. In other words, for each resistor Rf and R2 to R8, the ratio of its actual resistance to its designed resistance is fixed.

As shown in FIG. 3, the comparison circuit 50 of the component inaccuracy correction system 10 comprises six comparators. Each of the six comparators has two input ends and one output end. These comparators compare the voltage of the two input ends and output a comparison result from the output end. In the six comparators of the comparison circuit 50, the first input ends are respectively connected to the six nodes H15, H10, H05, L05, L10, and L15 of the voltage dividing circuit 40, and the second input ends are each connected to the reference voltage Vref generated by the reference voltage generator 30. In other words, the six comparators compare the divided voltage of each node in the voltage dividing circuit 40 to the reference voltage Vref. In this manner, the comparison circuit 50 serves as an analog-to-digital converter circuit to convert the analog signals outputted from the voltage dividing circuit into suitable digital signals to control the correction circuit 60.

The output end of each comparator in the comparison circuit 50 is respectively electrically connected to one of a plurality of correction circuit units 65 in the correction circuit 60. In the preferred embodiment, the correction circuit 60 comprises a plurality of correction circuit units 65 electrically connected in parallel with each other. Each of these correction circuit units 65 comprises a transistor S to serve as a switch, and a correction capacitor ΔC. The ON and OFF state of each transistor S is controlled by the output of the corresponding comparator in the comparison circuit 50. If the transistor S of a correction circuit unit 65 is switched ON, the capacitor ΔC of the correction circuit unit 65 is placed in parallel with the capacitor Cf of the wave filter 70. On the other hand, if the transistor S is OFF, the capacitor ΔC of the correction circuit unit 65 is electrically disconnected and so is not in parallel with the capacitor Cf of the wave filter 70.

Figure 4:
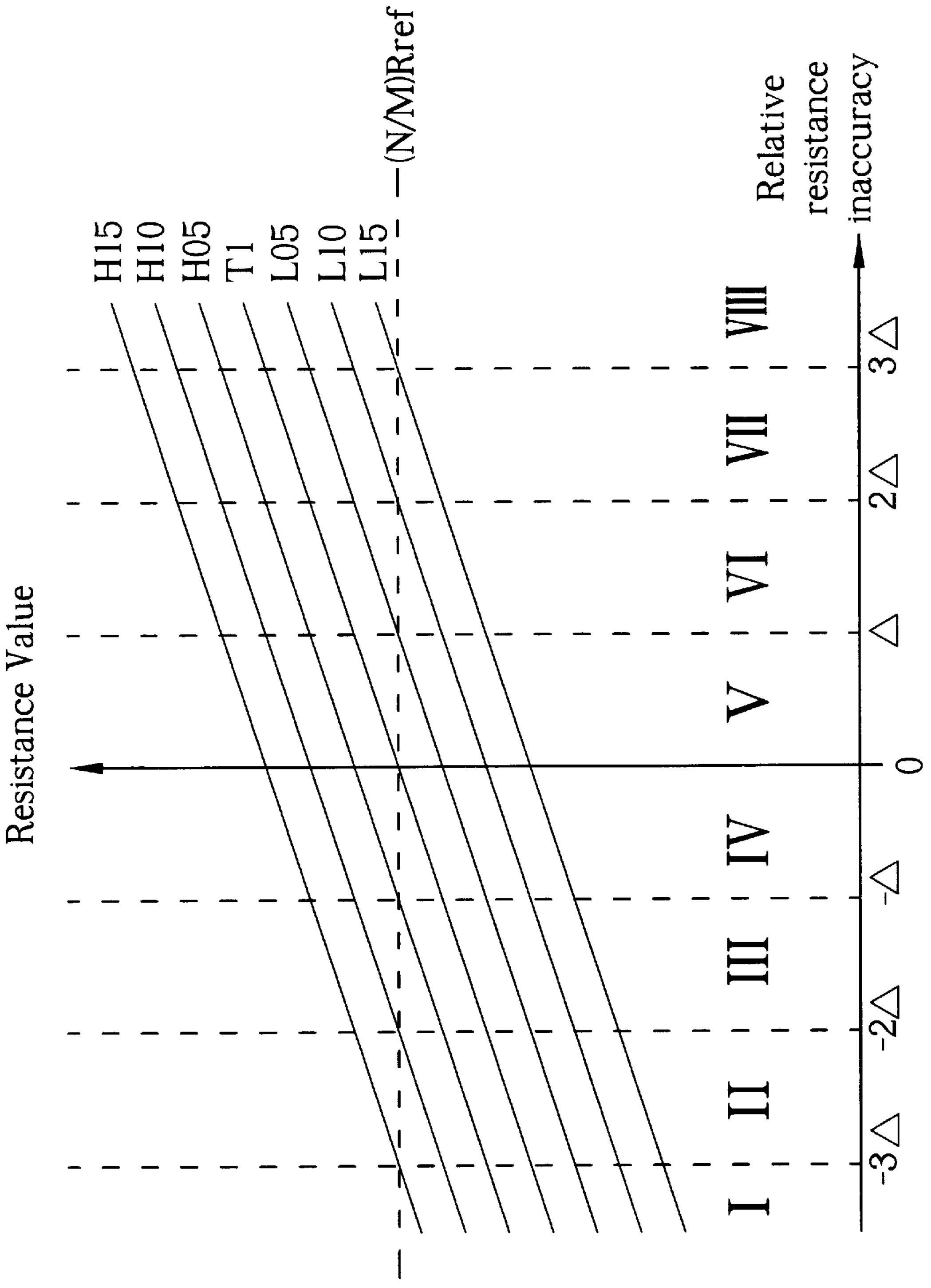
FIG. 4 is a functional relationship diagram of the resistance value of each node of a voltage dividing circuit of FIG. 3.

This embodiment will be further described as illustrated in FIG. 4. FIG. 4 shows the relationship between the resistance value of each node H15, H10, H05, T1, L05, L10, L15 in FIG. 3 and the relative resistance inaccuracies caused by the integrated circuit fabrication process. The relative resistance inaccuracy is defined as the ratio of the actual resistance variance of a resistor on the integrated circuit 5 to the designed value of the resistance for this resistor. For example, when the resistance relative inaccuracy of a resistor is Δ (such as 5%), the actual resistance of the resistor is greater than the original design value by the factor Δ (i.e., by 5%). Ideally, the relative resistance inaccuracy caused by the fabrication process should be 0, in which case the divided voltage of the node T1 is equal to the reference voltage Vref. Since the current ratio of the reference voltage generator 30 and the voltage dividing circuit 40 supplied by the current generator 20 is N:M, the total value of the resistance from the node T1 to ground (i.e., R2+R3+R4+R5) and the reference resistor Rref have the following relationship: M*(R2+R3+R3+R5 )=N*(Rref). As shown in FIG. 4, when the relative resistance inaccuracy is 0, the total resistance from the node T1 to ground exactly equals to (N/M)*Rref. In such a case, the total value of resistance between the nodes L05 and ground is less than (N/M)*Rref. The total value of resistance between L10 and ground, and between and L15 and ground are also less than (N/M)*Rref. So the divided voltage of the nodes L05, L10, and L15 is less than Vref. The output of the comparators electrically connected to the nodes L05, L10, and L15 has a low potential (because the divided voltages of the three nodes are all less than Vref) so that the respective switches S are ON, and the respective capacitors ΔC in the corresponding correct circuit unit 65 are in parallel with the capacitor Cf in the wave filter. Meanwhile, in the above-mentioned situation, the total value of the resistance from the nodes H15, H10, and H05 to ground will be greater than (N/M)*Rref, i.e. the divided voltages of the nodes H15, H10, and H05 are all greater than Vref. The outputs of the comparators connected to the three nodes H15, H10, and H05 have a high potential, and the respective switches S are OFF. The respective capacitor ΔC in the corresponding correct circuit unit 65 thus are electrically disconnected from being in parallel with the capacitor Cf. When the relative resistance inaccuracy is 0, the total value of the capacitance of the wave filter 70 with the correction circuit 60 is Cf+3ΔC, and so the bandwidth of the wave filter 70 with the correction circuit 60 is the product of (Cf+3ΔC) and Rf.

When the inaccuracy caused by the fabrication process causes the resistance of each resistor to be greater than the original design value, the total value of the resistance of each node to ground is also greater, as shown in FIG. 4. Nevertheless, as previously mentioned, Rref is an additional resistor installed outside of the integrated circuit 5, so the resistance value of Rref is not affected by the inaccuracy of the integrated circuit fabrication process. The ratio of the two currents generated by the current generator 20 is also not affected by the resistance inaccuracy, so (N/M)*Rref serves as a stable comparison standard, shown as the horizontal dotted line in FIG. 4. If the inaccuracy caused by the fabrication process is between Δ and 2Δ, the voltage dividing circuit 40 causes the total resistance from the node L05 to ground to be greater than (N/M)*Rref. The divided voltages of the nodes H15, H10, H05, and L05 are all thus greater than Vref. The respective comparator connected to each of these nodes causes the switch S in the correction circuit unit 65 to turn OFF, and only the switches S in the correction circuit unit 65 connected to the nodes L10 and L15 are turned ON. Therefore, when the resistance inaccuracy is between Δ and 2Δ, the total capacitance of the wave filter 70 with the correction circuit 60 is Cf+2ΔC. In other words, when the inaccuracy caused by the fabrication process causes resistance values to be greater than the original designed resistance values, the present invention component inaccuracy correction circuit 10 causes the total value of the capacitance of the wave filter 70 to decrease so that the product of the resistance of the wave filter 70 with the total capacitance is within a limited range.

When the resistance values of the nodes H15, H10, H05, L05, L10, and L15 to ground are changed due to an increasing or decreasing of the relative resistance inaccuracy, the relationship diagram in FIG. 4 can be divided into eight areas labeled I to VIII. In each area, the corresponding ON/OFF states for the correction circuit unit 65 controlled by the comparators connecting to each node is listed in FIG. 5. In FIG. 5, if the comparator connecting to a node causes the corresponding switch S to be closed and the correction circuit unit 65 is electrically connected in parallel with the capacitor Cf, the corresponding switch S is labeled "ON". If the comparator connecting to a node causes the corresponding switch S to be open and the correction circuit unit 65 is electrically disconnected from being in parallel with the capacitor Cf, the corresponding switch S is labeled "OFF". In area I, all correction circuit units 65 are enabled, and so all capacitors ΔC are in parallel with Cf. The total value of the capacitance of the wave filter 70 with the correction circuit 60 is thus Cf+6ΔC. With comparison to FIG. 4, the value of the resistor Rf must be at least less than the original design value by 3Δ. Therefore, all correction circuit units 65 in the correction circuit 60 are enabled and electrically connected in parallel with the capacitor Cf so as to compensate for the low resistance of Rf.

Similarly, in area II, the relative resistance inaccuracy is between −3Δ and −2Δ.

Only the total resistance of the node H15 with respect to ground is greater than (N/M)*Rref. The corresponding switch S for node H15, controlled by the corresponding comparator, is open so that the total capacitance of the wave filter 70 with the correction circuit 60 is Cf+5ΔC. In area III, the relative resistance inaccuracy is between −2Δ to −Δ, with four correction circuit units 65 enabled so that the total capacitance value of the wave filter 70 with the correction circuit 60 is Cf+4 ΔC.

In area VII, the relative resistance inaccuracy is between 2Δ to 3Δ, with only one correction circuit unit 65 enabled. In this case, the resistor Rf, affected by the inaccuracies of the fabrication process to an excessive resistance value, is compensated for with the total capacitance of the wave filter 70 with the correction circuit 60 being reduced to Cf+ΔC. Finally, in area VIII, the relative resistance inaccuracy is over 3Δ, and so all correction circuit units 65 are disabled and electrically disconnected from being in parallel with Cf so that the total capacitance of the wave filter 70 with the correction circuit 60 is Cf.

In short, the present invention component inaccuracy correction system 10 uses a current generator 20, composed of current mirrors, to generate two output currents with a fixed ratio, which are then respectively input into the reference voltage generator 30 and the voltage dividing circuit 40. Since the ratio of the two currents is fixed, the ratio of the reference voltage Vref generated by the reference voltage generator 30 with each divided voltage of the voltage dividing circuit 40 directly transfer to the ratio of the two corresponding resistances. The ratio of the two corresponding resistances may also be transferred to the ratio the voltages. Since the resistor Rref of the reference voltage generator 30 is an additional, external resistor, whereas the voltage dividing resistors of the voltage dividing circuit 40 and the resistor Rf of the wave filter 70 all suffer from the same relative resistance inaccuracy, the resistance inaccuracy of each resistor caused by the fabrication process of the integrated circuit 5 can be known by comparing the reference voltage of the reference voltage generator 30 with each divided voltage of the voltage dividing circuit 40. The voltage difference caused by the resistance inaccuracy is compensated for by the comparator in the comparison circuit 50, which controls the correction circuit 60.

The current generator of the present invention component inaccuracy correction system is composed of a current mirror. The current mirror is used to generate the reference voltage of the reference voltage generator 30 and each divided voltage of the voltage dividing circuit 40. With this design the present invention does not need a standard voltage and a bias voltage to generate a divided voltage for comparison, as is done in the prior art. This advantage makes the present invention useable in portable electronic products. These portable electronic products, such as cellular phones or notebooks, frequently use battery power to supply a bias voltage to the integrated circuit 5. As the power stored in the battery is gradually consumed, the bias voltage may drift from a designed value. In the case of an unstable power supply, prior art devices that require another system for a bias voltage to generate the divided voltage for comparison, may not function normally. In contrast to the prior art, in the present invention component inaccuracy correction system, the purpose of the current generator 20 is to supply two currents with a fixed ratio. The magnitude of the currents does not affect the operations of the component inaccuracy correction system, despite the fact that the bias voltage of the current mirror may change over time.

As mentioned above, the present invention component correction system 10 compensates for resistance inaccuracies of a wave filter by changing the value of the capacitance of the wave filter. However, the functionality of the preferred embodiment is not limited to this. By changing the structure of the correction circuit 60, the present invention may also be used in other embodiments. For example, more voltage dividing resistors in the voltage dividing circuit 40, and more corresponding comparators and correction circuit units 65, may be added if better accuracy is required. In this manner, the value (percentage) of Δ may be reduced. If the inaccuracy of the fabrication process can be controlled to a fixed range, the number of voltage dividing resistors and corresponding comparators and correction circuit units can also be reduced to reduce cost.

Those skilled in the art will readily observe that numerous modifications and alternations of the device may be made while retaining the teachings of the invention. Accordingly, the above disclosure should be construed as limited only by the metes and bounds of the appended claims.

What is claimed is:

1. A component inaccuracy correction system comprising:

a reference voltage generator comprising a first resistor electrically connected to an integrated circuit;

a voltage dividing circuit comprising at least a set of series resistors formed in the integrated circuit;

a current generator electrically connected to the reference voltage generator and to the voltage dividing circuit, the current generator supplying current to the first resistor to generate a reference voltage, and supplying current to the series resistors, the voltage dividing circuit generating a first divided voltage and a second divided voltage; and a comparison circuit electrically connected to the output end of the voltage dividing circuit, the comparison circuit comparing the first and second divided voltages to the reference voltage for detecting an inaccuracy of a resistance value of the series resistors.

2. The component inaccuracy correction system of claim 1 wherein the currents supplied by the electric current generator to the first resistor, and to the series resistors, have a predefined ratio.

3. The component inaccuracy correction system of claim 2 wherein the predefined ratio of the currents supplied by the current generator is equal to 1.

4. The component inaccuracy correction system of claim 1 further comprising a correction circuit electrically connected to the comparison circuit correcting component inaccuracy in the integrated circuit according to a compare signal generated by the comparison circuit.

5. The component inaccuracy correction system of claim 4 wherein the correction circuit comprises a correction component and a switch, a control port of the switch being electrically connected to the comparison circuit capable of turning on or turn off the correction component according to the comparison signal.

6. The component inaccuracy correction system of claim 5 wherein the correction component is a capacitor.

7. The component inaccuracy correction system of claim 6 corrects a wave filter circuit, the wave filter circuit formed on the integrated circuit and electrically connected to the correction circuit in a parallel manner, the correction circuit corrects component inaccuracy in the wave filter circuit.

8. The component inaccuracy correction system of claim 7 wherein the wave filter circuit comprises a capacitive component and a resistive component, and the correction circuit corrects a product of capacitance of the capacitive component and a resistance of the resistive component.

9. The component inaccuracy correction system of claim 1 wherein the series resistors comprise a plurality of resistors connected to each other in a series manner, each series connection outputting a divided voltage at a corresponding output port of the voltage dividing circuit, the comparison circuit comparing each divided voltage to the reference voltage.

10. The component inaccuracy correction system of claim 9 wherein the comparison circuit comprises at least a comparator, each comparator comprising a first input port electrically connected to an output port of the voltage dividing circuit to receive a corresponding divided voltage, and a second input port for inputting the reference voltage, wherein each comparator compares the corresponding divided voltage to the reference voltage and outputs a corresponding comparison signal from an output port.

11. A correction system for adjusting a bandwidth of a resistor-capacitor (RC) wave filter, the RC wave filter comprising a resistor array and a capacitor array, the correction system comprising:

a first resistor comprising a reference voltage end;

a voltage dividing circuit comprising a divided voltage end;

an electric current generator supplying a fixed ratio of current to the first resistor and to the voltage dividing circuit, respectively, so that the reference voltage end of the first resistor generates a reference voltage, and the divided voltage end of the voltage dividing circuit generates a divided voltage; and a comparison circuit for comparing the divided voltage and the reference voltage, and to output a digital signal to control the capacitance of the capacitor different capacitance values.

12. The correction system of claim 11 wherein the fixed ratio of currents supplied by the electric current generator is equal to 1.

13. The correction system of claim 11 further comprising a plurality of switches corresponding to each capacitor in the capacitor array, respectively, a control port of each switch electrically connected to the comparison circuit to open or close the switch according to the digital signal.

14. The correction system of claim 13 wherein the voltage dividing circuit comprises a plurality of resistors connected to each other in a series manner, each resistor comprising a divided voltage point, the comparison circuit comparing the voltage of each divided voltage point to the reference voltage and outputting the digital signal to control the switches.

15. A correction system for adjusting a resistor-capacitor (RC) wave filter inside an integrated circuit, the RC wave filter comprising a resistor array and a capacitor array, the correction system comprising:

an first resistor positioned outside the integrated circuit comprising a reference voltage end;

a voltage dividing circuit positioned inside the integrated circuit and having at least a set of series resistors comprising a divided voltage end;

an electric current generator supplying a fixed ratio of current to the first resistor and to the voltage dividing circuit, respectively, so that the reference voltage end of the first resistor generates a reference voltage, and the divided voltage end of the voltage dividing circuit generates a divided voltage; and a comparison circuit for comparing the divided voltage and the reference voltage and outputting corresponding digital signals to control the capacitor array to generate different capacitance values according to inaccuracies of the series resistors.

16. The correction system of claim 15 wherein the fixed ratio of currents supplied by the current generator is equal to 1.

17. The correction system of claim 15 further comprising a plurality of switches corresponding to each capacitor in the capacitor array, respectively, a control port of each switch electrically connected to the comparison circuit to open or close the switch according to the digital signals.

18. The correction system of claim 17 wherein the voltage dividing circuit comprises a plurality of resistors connected to each other in a series manner, each resistor comprising a divided voltage point, the comparison circuit comparing the voltage of each divided voltage point to the reference voltage and outputting corresponding digital signals to control the switches.

* * * * *